Figure 1:
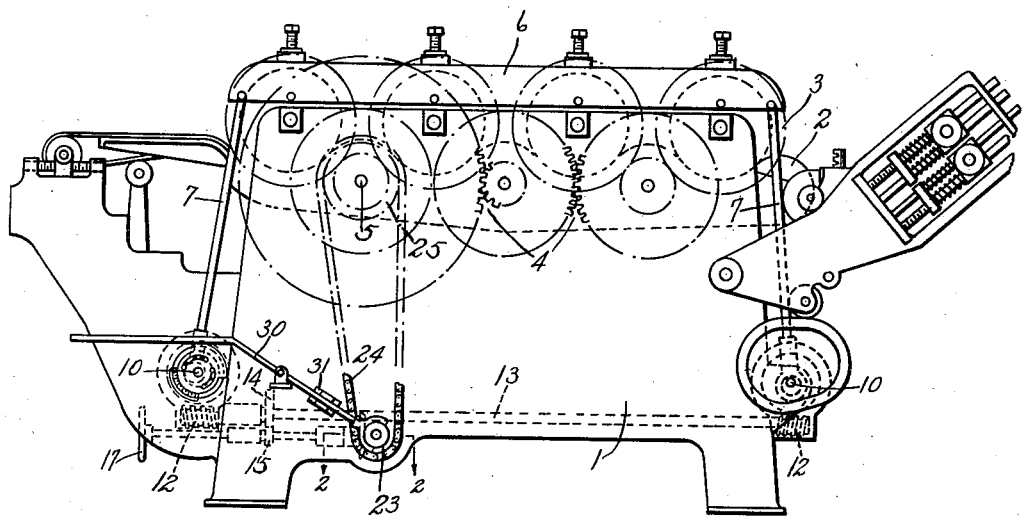

Aug. 13, 1940.    H. J. SHIRLEY    2,211,610
AUTOMATIC CONTROL FOR THE ROLL PRESSURE DEVICE OF FLATWORK IRONERS
Filed Jan. 31, 1938    2 Sheets-Sheet 1

INVENTOR
HARVEY J. SHIRLEY
BY
ATTORNEYS

Patented Aug. 13, 1940

2,211,610

UNITED STATES PATENT OFFICE 2,211,610

AUTOMATIC CONTROL FOR THE ROLL PRESSURE DEVICE OF FLATWORK IRONERS

Harvey J. Shirley, Norwood, Ohio, assignor to The American Laundry Machinery Company, Cincinnati, Ohio, a corporation of Ohio Application January 31, 1938, Serial No. 187,846

2 Claims. (Cl. 38—4)

This invention relates to ironing machines of the type in which the work is carried between a heated ironing member or chest and a series of padded ironing rolls which are adjustable or movable into and out of ironing relation with said member. The invention has to do with a mechanism for so moving the rolls, which is designed for automatic control after it is set in operation by the operator.

The invention is an improvement upon the mechanism described, shown and claimed in two applications filed of even date herewith, to-wit, an application of Norman S. McEwen and Shirley C. Ward for Automatic pressure control for flatwork ironers, Serial No. 187,826, and an application by myself for Automatic control for the roll pressure device of flatwork ironers, Serial No. 187,845, to either or both of which reference may be had for a more complete description of the mechanism, if desirable or necessary.

According to the invention of said copending applications, roll adjusting movement toward and from the ironing member or chest is controlled by a lever actuated by the operator to initiate either roll advancing or roll retracting movement, such movement being terminated automatically by machine operated cams, that cam which terminates the roll advancing movement being adjustable to determine the degree of pressure.

According to the present invention similar mechanism is employed, but the machine, instead of positively returning the control lever to neutral position after it has been initially moved by the operator, simply restrains said lever or prevents its return to neutral position until the roll adjusting movement is completed, whether it be roll advance or roll retraction, and upon termination of such movement the lever is suddenly returned by an energizing device through its entire return movement, or by snap action, as will more fully appear.

The present invention therefore has for its object to improve the control and operating mechanism so as to provide snap action for the return movement of the control lever and avoid undue strain on the parts such as occurs when the lever is gradually returned during the progress of the roll adjusting movement.

A further object is to provide mechanism of the character described in which both the roll advancing and roll retracting movements are automatically terminated by the machine, the parts being adjustable to vary the degree of pressure or the final roll position when the rolls are advanced.

Further objects of the invention are in part obvious and in part will appear more in detail hereinafter.

Figure 2:
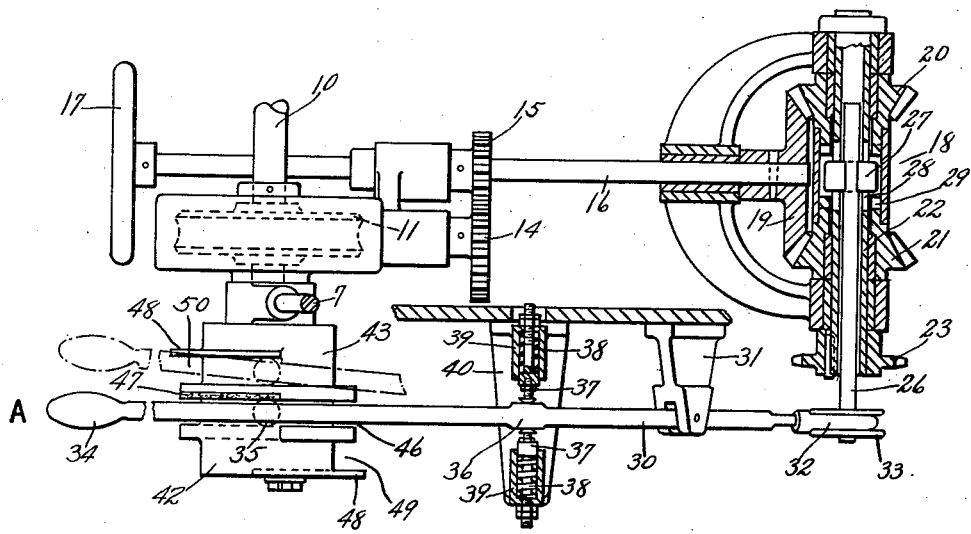
Figure 3:
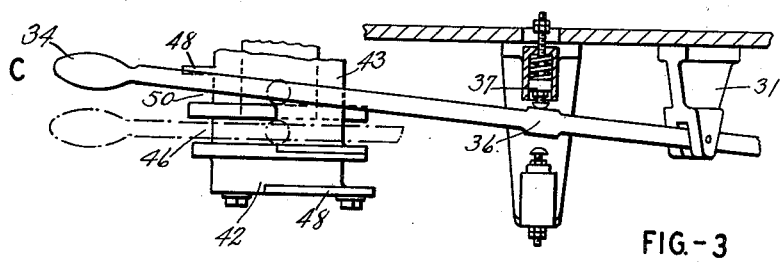
Figure 4:
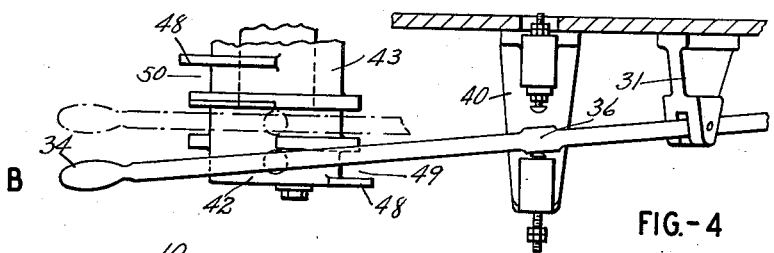
Figure 5:
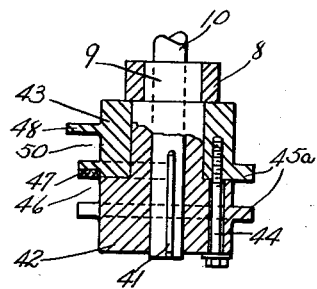
Figure 7:
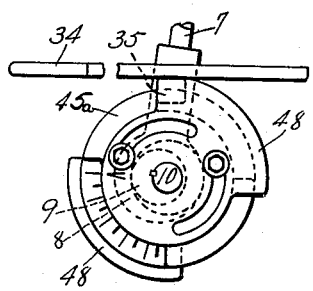
Figure 6:
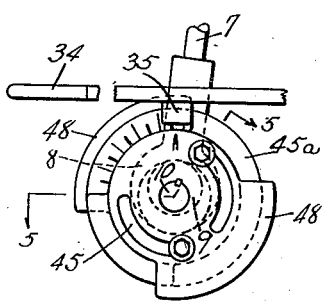
Figure 8:
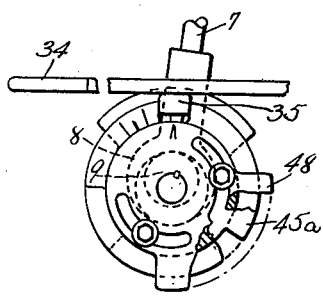

In the drawings, which represent one suitable embodiment of the invention, Fig. 1 is a side elevation, partly diagrammatic, of one form of ironing machine embodying the invention; Fig. 2 is a plan view, partly in section on the line 2—2, Fig. 1, of the control devices; Fig. 3 is a plan view, corresponding to Fig. 2, illustrating another position of the parts; Fig. 4 is a similar view illustrating still another position of the parts; Fig. 5 is a detail sectional view on the line 5—5, Fig. 6; Fig. 6 is a side elevation of the cam assembly, with the parts in pressure-off position; Fig. 7 is a similar view, showing the parts with minimum pressure applied; Fig. 8 is a similar view, with the parts in position to provide greater pressure.

While the invention may be applied to any form of ironing machine in which one or more padded rolls are applied to an ironing member for producing the ironing effect, such as one where the ironing member is a large heated smooth surfaced roll, for convenience, and in no sense of limitation, the invention has been shown applied to a machine of roll and chest type.

The machine shown comprises a suitable frame 1 supporting a hollow heated grooved ironing member or chest 2, the concavities of which are designed to receive the several padded rolls 3 all driven in the usual manner by gearing marked generally 4 and including a main shaft 5. The rolls are moved into and out of the pressure applying position shown by the usual vertically movable pressure bars 6 by which they may be lifted out of the concavities of the chest 2 to remove their padded surfaces from contact with the heated chest surfaces or they may be lowered into contact therewith so as to apply the desirable degree of pressure for the ironing operation.

Pressure bars 6 are operated by lifting rods 7 pivoted to them, said rods at their lower ends having straps 8 embracing eccentrics 9 (Fig. 5) on cross shafts 10 each provided with a worm gear 11 driven by a worm 12 on a longitudinally extending shaft 13 driven by gears 14, 15 from a shaft 16. Said shaft is provided at one end with a hand wheel 17 for hand operation or adjustment of the parts when necessary or desirable, and at its opposite end with connections to a suitable clutch controlled reversing mechanism, such as the usual form indicated generally at 18, Fig. 2. This mechanism, briefly described, comprises a bevelled driven pinion 19 fast on shaft 16 and coupled to two opposite axially alined loose bevel pinions 20, 21 journalled on a hollow shaft 22 provided with driving connections, such as the sprocket 23 connected by a chain 24 to a sprocket 25 on the main shaft 5. Within the hollow shaft 22 is slidable a rod 26 having a clutch member 27 extending outwardly through elongated slots 28 in the shaft 22 and designed to be engaged selectively with clutch teeth 29 on the inner ends of the two loose pinions 20, 21 to rotatably drive the shaft 16 in one direction or the other according to which pinion, 20, 21, becomes the active driving member. Rod 26 is shifted back and forth, longitudinally, to produce drive in one direction or the other by a lever 30 pivoted on a bracket 31 of the main frame, one arm of said lever being provided with a fork 32 engaging a grooved collar 33 on the rod, the other arm of the lever having a handle 34. Lever 30 normally occupies an intermediate or neutral position shown in full lines and marked A, Fig. 2, but it may be moved either to a pressure relieving position shown in full lines and marked B, Fig. 4, or to a pressure applying position shown in full lines and marked C, Fig. 3. Said lever is provided with an abutment device, such as the roller 35, and has an operating portion marked 36, Fig. 2.

Lever 30 is biased toward or normally is held in its intermediate or neutral position A by two yielding abutments 37, shown as adjustable bolts each backed up by a compression spring 38 in a housing 39, the housings being carried by a bracket 40 fixed to the casing. Said two abutments lie one on either side of the operating portion 36 of lever 30. These yielding abutments automatically operate the clutch in the manner to be described for the purpose of terminating the roll adjusting movements, the present invention providing restraining means for holding lever 30 in either of its "on" positions, B or C, to which it may be moved by the operator. Of course, the several eccentrics 9 are all fixed to the shafts 10, as by keys 41, Fig. 5, so that they are all relatively timed and in step with each other, as will be readily understood. The restraining means for holding lever 30 in either of its "on" positions comprises two members marked respectively 42, 43, Fig. 5. Member 42 restrains the lever when it is moved to the pressure relieving position B and said member in the arrangement shown is integral or fixedly attached to eccentrics 9, so that the key 41 definitely and permanently times member 42 around the axis of shaft 10. Member 43, however, is adjustable around the shaft axis, for which purpose it is sleeved upon a portion of member 42 and is provided with bolts 44 passing out through slots 45 in member 42 to the front end thereof where they are accessible for clamping member 43 in any position to which it may be adjusted around the shaft axis.

Members 42 and 43 are each provided with two annular flanges, to-wit, inner flanges 45a of relatively low height and lying adjacent each other so as to form between them a groove or channel 46 in which the lever abutment 35 normally lies. These two flanges do not extend entirely around the periphery of members 42 and 43 but only part way, the gaps in said flanges providing passageways through which the abutment 35 can move as the lever 30 is returned to its neutral position.

Preferably each of the flanges 45a is provided with an insert 47 of resilient material, such as fibre or the like, to absorb the shock of impact of member 35 when it returns to neutral position, although this is not essential.

Members 42 and 43 also are provided with outer annular walls or flanges 48 of increased height above the height of flanges 45a. Similarly, flanges 48 do not extend completely around the periphery but are of segmental form as shown.

Assuming the parts in the position shown in full lines Fig. 2, control lever 30 is in its intermediate or neutral position where it is held by the yielding abutments 37. Its abutment 35 lies in the channel 46. Said lever is sufficiently flexible, or it is a sufficiently sloppy fit in its pivotal mounting in bracket 31, so that the operator can grasp the handle of the lever and raise it in Fig. 1 so as to elevate its abutment 35 above the edges of the flanges 45a.

Assuming the rolls in pressure relation with the concavities of the chest and a desire on the part of the operator to relieve pressure, the operator grasps the handle 34, raises lever 30 until its abutment 35 is above the flanges 45a and moves it downward in Fig. 2 to the position B shown in full lines, Fig. 4, until it engages the high flange 48 on member 42. Thereupon the operator releases the lever and because it is properly registered with the channel 49 of member 42 its abutment enters said channel and stays there, even though the spring of the lower abutment 37, Fig. 4, has been compressed and has stored sufficient energy to return the lever when it is released.

Adjustment of the lever to position B closes the clutch and the reversing mechanism drives the shaft 10 in the direction to raise the rolls from the concavities of the chest. The same rotation of shaft 10 turns members 42 and 43. The operation proceeds until finally the rolls are fully elevated out of the concavities. At this time abutment 35 reaches and passes beyond the end of the lower flange 45a of member 42, whereupon the proper abutment spring 38 takes effect and snaps the lever back to the neutral position A, Fig. 2. This uncouples the clutch and the adjusting operation is terminated, the parts remaining in their new positions ready for another control operation by the operator.

To apply pressure the operator now grasps the handle 34, elevates lever 30 to remove its abutment from the neutral channel 46 and throws the lever over to the pressure applying position C, Fig. 3. Release of the lever permits its abutment to enter the channel 50 of member 43, proper registration of the abutment with the channel being effected by the high flange 48, as before. This motion of the lever couples the clutch and the reversing mechanism again operates, but now in the reverse direction so that shaft 10 is driven in the direction to apply the rolls to the chest. The motion continues until finally the rotation of shaft 10 brings the end of the flange 45a of member 3 to a position where abutment 35 passes beyond its end, and the lever is snapped back to neutral position as before, thus uncoupling the clutch and terminating the roll advance movement.

Adjustment of the mmeber 43 around the axis of shaft 10 obviously may be utilized for the purpose of varying the pressure to give it any desired value or, in case the padding compresses, over a period of operation, to compensate for padding compression and maintain uniform pressure.

With the arrangement described, the clutch is always opened or released by full movement and by snap or sudden action. As a consequence the rotative effect is never applied to the clutch while it is gradually being uncoupled with the possibility of breaking the clutch teeth or otherwise injuring the mechanism.

One advantage of the invention is the simplicity and ease with which the invention may be adapted to machines already in use where the control of the roll raising and lowering mechanism is entirely manual. Such machines are usually equipped with four of the eccentrics 9 and a clutch operating lever 30 which the operator moves to either of its clutch closing positions to initiate roll adjusting movement and then returns to its neutral position when the adjustment is completed. With such a machine, the appropriate one of the eccentrics 9 is removed and a new eccentric installed to which is connected the members 42, 43, with their flanges, according to this invention, as well as a bracket 40 carrying the lever returning spring devices, and an abutment member for the lever, such as the roller 35. By the provision of these parts the machine is made semi-automatic as to its control in the sense that the operator initiates the roll adjusting movement, but said movement is automatically terminated, with the possibility, by adjustment of member 43, of timing the roll advancing movement to secure any desired degree of pressure.

Other advantages of the invention will be apparent to those skilled in the art.

What I claim is:

1. In apparatus of the character described having a chest and a cooperating roll adjustable toward and from the chest, the combination of roll adjusting mechanism, comprising a clutch operated reversible driving shaft for adjusting the roll, a clutch operating lever having a neutral position and movable selectively to either of two clutch coupling positions, in one of which the roll is advanced and in the other of which it is retracted, yielding means tending to bias said lever to return to its neutral position, said shaft being provided with two peripheral segmental flange members spaced apart along the shaft and between which an abutment portion of the lever lies when it is in neutral position, the segmental flanges of said members forming stops to hold the lever in its clutch coupling positions when moved thereto and each adapted upon shaft rotation and by movement of the end of the segmental flange beyond the abutment portion of the lever to release the lever for its return to neutral position to terminate the roll adjustment movement, that one of said members which terminates roll advancing movement being rotatably adjustable around the shaft axis to vary the time of completion of roll advancing movement.

2. In apparatus of the character described having a chest and a cooperating roll adjustable toward and from the chest, the combination of roll adjusting mechanism, comprising a clutch operated reversible driving shaft having an eccentric for adjusting the roll, a clutch operating lever having a neutral position and movable selectively to either of two clutch coupling positions, in one of which the roll is advanced and in the other of which it is retracted, yielding means tending to bias the lever to return to neutral position, said shaft being provided with two peripheral extending segmental flange members spaced along the shaft and between which an abutment portion of the lever lies when it is in neutral position, the segmental flanges of said members forming stops to hold the lever in its clutch coupling positions, one of said flange members being supported by and fixed to said eccentric and the other being rotatably adjustable around the shaft axis relative thereto, and each of said flange members being adapted upon shaft rotation and by movement of the end of the segmental flange beyond the abutment portion of the lever to release the lever for return to neutral position.

HARVEY J. SHIRLEY.